United States Patent [19]

Liu

[11] Patent Number: 5,005,954

[45] Date of Patent: Apr. 9, 1991

[54] METHOD AND APPARATUS FOR SECOND-RANK TENSOR GENERATION

[75] Inventor: Hua-Kuang Liu, South Pasadena, Calif.

[73] Assignee: The United States of America as represented by the Administrator of the National Aeronautics and Space Administration, Washington, D.C.

[21] Appl. No.: 310,992

[22] Filed: Feb. 16, 1989

[51] Int. Cl.[5] .......... G02B 5/23; G06G 7/16; G06G 7/162; G06G 9/00

[52] U.S. Cl. .......... 350/354; 350/353; 350/358; 364/713; 364/822; 364/837; 364/841; 364/845; 364/846

[58] Field of Search .......... 350/354, 162.12, 353, 350/358; 364/845, 841, 822, 837, 846, 713

[56] References Cited

U.S. PATENT DOCUMENTS

| | | | |
|---|---|---|---|
| 4,009,380 | 2/1977 | Bocker et al. | 235/181 |
| 4,508,431 | 4/1985 | Henshaw | 350/354 |
| 4,569,033 | 2/1986 | Collins et al. | 364/845 |
| 4,592,004 | 5/1986 | Bocker et al. | 364/713 |
| 4,620,293 | 10/1986 | Schlunt et al. | 364/845 |
| 4,686,647 | 8/1987 | Soffer et al. | 364/850 |
| 4,767,197 | 8/1988 | Yeh | 350/354 |

OTHER PUBLICATIONS

Pepper, D. M. et al.; "Spatial Convolution and Correlation of Optical Fields via Degenerate Four-Wave Mixing"; Jul. 1978; p. 79; Optic Letters.

Shkunov et al.; "Optical Phase Conjugation"; Dec. 1985; pp. 54–59; Scientific American.

*Primary Examiner*—Eugene R. LaRoche

*Assistant Examiner*—Evelyn Lester

*Attorney, Agent, or Firm*—Thomas H. Jones; Harold W. Adams; John R. Manning

[57] ABSTRACT

A method and apparatus for generation of second-rank tensors using a photorefractive crystal to perform the outer-product between two vectors via four-wave mixing, thereby taking 2n input data to a control $n^2$ output data points. Two orthogonal amplitude modulated coherent vector beams x and y are expanded and then collimated before directing them onto two opposing parallel sides of the photorefractive crystal in exact opposition. A beamsplitter is used to direct a coherent pumping beam onto the crystal at an appropriate angle so as to produce a conjugate beam that is the matrix product of the vector beams x and y, and to separate the resulting conjugate beam that propagates in the exact opposite direction from the pumping beam. The conjugate beam thus separated is the tensor output $xy^T$.

6 Claims, 1 Drawing Sheet

METHOD AND APPARATUS FOR SECOND-RANK TENSOR GENERATION

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

This invention relates to a method and apparatus for real-time generation of second-rank tensors using nonlinear photorefractive crystals.

BACKGROUND ART

A tensor is an element of an abstract system used to denote position determined within the context of more than one coordinate system, a special case of which is a vector that is determined in a single coordinate system. Before presenting the optical apparatus of the present invention for generating second-rank tensors, the definition of a second-rank tensor will be reviewed, and then properties of nonlinear photorefractive materials used in the apparatus will be reviewed.

Assume a given group G of linear transformations in the n-dimensional space $R_n$. A vector x in the space has components $x_1, \ldots x_n$. The transformation A of the group G transforms x into x':

$$x' = Ax, x_i' = a_{ij}x_j \qquad (1)$$

where i=1, 2, . . . , n.

Taking the product of x and y ($x \epsilon R_n$, $y \epsilon R_n$), and applying the transformation Equation (1), the set of tensor quantities is $$x_i'y_j' = a_{ik}a_{jl}x_ky_l, \qquad (2)$$

The $n^2$ quantities of $x_iy_j$ transform according to A x A.

A set of $n^2$ quantities $\tau'_{ij}$ whose law of transformation is $$\tau'_{ij} = a_{ik}a_{jl}V\tau_{kl} \qquad (3)$$

form a tensor T of rank two.

Recently, nonlinear photorefractive materials such as GaAs, $BaTiO_3$, $LiNbO_3$, $Bi_{12}Si_{20}O_3$ (BSO), and $Sr_{1-x}Ba_xNb_2O_6$ (SBN) have been used in two-wave, three-wave and four-wave mixing schemes. The present invention uses a four-wave mixing scheme for the architecture of an optical tensor generator.

The fundamental principle of four-wave mixing illustrated in FIG. 1 is to apply three waves $E_1$, $E_2$ and $E_p$ as inputs to the nonlinear photorefractive crystal 10. An output conjugate wave $E_c$ proportional to the multiplication of the two input waves can be obtained through the third-order nonlinear interaction of the three input waves and the photorefractive crystal 10. The resultant polarization can be written as $$P_{out} = \tfrac{1}{2}x^{(3)}E_1(r)E_2(r)E_p^*(r)\, e[i(\omega_1\omega_2\omega_p)t-(_1+k_2-k_p)z]+c.c. \qquad (4)$$

where $\omega_1$, $\omega_2$ and $\omega_p$ are the frequencies of the three input waves, and $$E_1(r,t) = E_1(r)e^{i(\omega_1 t - k_1 z)} + c.c.$$

$$E_2(r,t) = E_2(r)e^{i(\omega_2 t - k_2 z)} + c.c. \qquad (5)$$

$$E_p(r,t) = E_p(r)e^{i(\omega_p t - k_p z)} + c.c.$$

are the electric fields of the three input waves, and $X^{(3)}$ (originally a tensor quantity) is taken as a scalar quantity based on the assumption that the waves are copolarized.

The third-order nonlinear polarization in Equation (4) radiates the conjugate wave $E_c$ of frequency $$\omega_c = \omega_1 + \omega_2 - \omega_p, \qquad (6)$$

where if $\omega_1 = \omega_2 = \omega_p = \omega$, then $\omega_c = \omega$.

When a plane wave is selected for $E_p$, the conjugate wave $E_c$ will be propagating in the opposite direction of the pumping plane wave. The amplitude of the conjugate wave $E_c$ will be proportional to the multiplied value of $E_1$ and $E_2$. This is the basic principle used in the second-rank tensor generator of the present invention.

In summary of the basic principle utilized in this invention, the nonlinear refractive crystal 10 provides four-wave mixing of a coherent incident beam $E_p$ with coherent input beams $E_1$ and $E_2$. The beams $E_1$ and $E_2$ are arranged to pass through the crystal 10 in exact opposition, and the beam $E_p$ is so oriented at an appropriate angle as to pass through the crystal 10 and produce self-induced diffraction gratings in the crystal. The interaction of beams $E_1$ and $E_2$ with this diffraction grating produces the conjugate beam $E_c$ that is proportional to the product of beams $E_1$ and $E_2$.

STATEMENT OF THE INVENTION

In accordance with the present invention, a real-time tensor generator utilizes means for generating first and second amplitude modulated coherent vector beams orthogonally disposed in space, and incident in exact opposition on parallel sides of a nonlinear refractive crystal. The first vector beam is expanded using a first cylindrical lens, and then collimated using a second cylindrical lens. The second vector beam is expanded using a third cylindrical lens, and then collimated using a fourth cylindrical lens. A coherent pumping beam is so directed onto one of the parallel sides of the nonlinear refractive crystal at an appropriate angle to the common axis of the first and second vector beams so as to perform matrix multiplication of the first and second vector beams using the nonlinear photorefractive crystal as a four-wave mixer to produce a conjugate beam as the matrix multiplication product of the first and second vector beams. A beam-splitter separates the conjugate beam from the pumping beam while reflecting the pumping beam onto the nonlinear photorefractive crystal, thereby to provide an output tensor beam.

The novel features that are considered characteristic of this invention are set forth with particularity in the appended claims. The invention will best be understood from the following description when read in connection with the accompanying drawings.

DETAILED DESCRIPTION OF THE INVENTION

Figure 1:
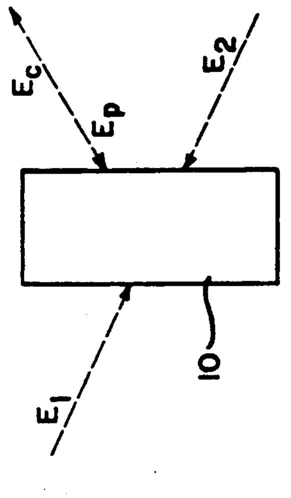
FIG. 1 (PRIOR ART)
FIG. 1 illustrates basic four-wave mixing of three input waves in a crystal of nonlinear photorefractive material.
Figure 2:
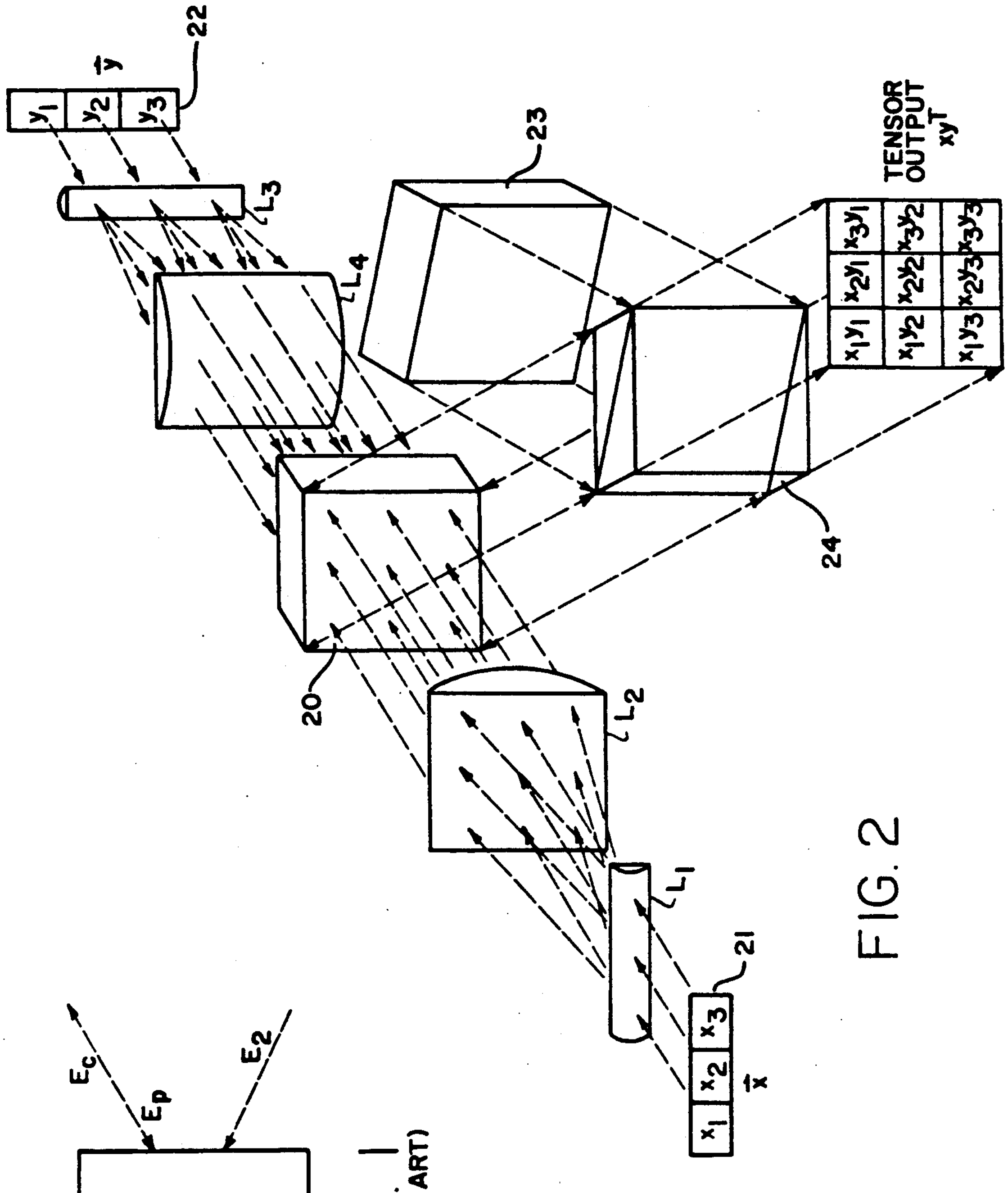
FIG. 2 illustrates the architecture of a tensor generator using a crystal of nonlinear photorefractive material in accordance with the present invention.

Referring to FIG. 2, first and second amplitude modulated vector beams x and y from separate coherent sources 21 and 22 are multiplied to generate a tensor output $xy^T$ using a crystal 20 of nonlinear photorefractive material and a coherent plane wave pumping beam from a source 23. All three of the beams are generated at the same frequency, preferably using diode lasers. The vectors x and y may be separately generated by spatial light modulators, or more directly by modulating arrays of laser diodes, one linear array for each vector. If each of the components is to have a binary value, the necessary modulation consists of simply modulating the components $x_i$ and $y_i$ to be either on or off.

The vector x from source 21 is expanded vertically by a cylindrical lens $L_1$ and collimated by a cylindrical lens $L_2$. This forms three columns of uniformly collimated light representing the three components of vector x. Likewise, the vector beam y from source 22 is expanded in the horizontal direction and collimated by cylindrical lenses $L_3$ and $L_4$. The plane wave pumping beam from a source 23 is reflected by a beamsplitter 24 onto the photorefractive crystal 20 at an appropriate angle with respect to the common axis of the vector beams so as to produce a conjugate beam. The phase conjugated beam from the photorefractive crystal 20 passes through the beamsplitter 24 and carries the tensor information $xy^T$ proportional to the matrix product of the vectors x and y, as shown.

This second-rank tensor generator has practical applications for optical implementations of neural networks, beam steering of phased array antennas, and dynamically switchable optical interconnections in VLSI circuitry among others. For example, in neural networks, a fundamental part is the storage of a priori known vectors in a summed outer-product matrix T:

$$T = \sum_{i=1}^{M} V_i V_i^{tr} \quad (7)$$

where there are M vectors of N-tuple vector to be stored and $V_i^{tr}$ denotes the transpose of $V_i$. By superimposition of each individual outer-product of the vector, Equation (7) can be optically implemented.

In the case of VLSI interconnections and beam steering, it is possible to design a specific pattern of beams of desired intensity and place them at designated positions in space. For example, $$\text{If } V_1=(10011011),$$

and $$V_2=(11101101), \quad (8)$$

$$\text{then } V_1V_2^{tr} = \begin{vmatrix} 1&1&1&0&1&1&0&1 \\ 0&0&0&0&0&0&0&0 \\ 0&0&0&0&0&0&0&0 \\ 1&1&1&0&1&1&0&1 \\ 1&1&1&0&1&1&0&1 \\ 0&0&0&0&0&0&0&0 \\ 1&1&1&0&1&1&0&1 \\ 1&1&1&0&1&1&0&1 \end{vmatrix} \quad (9)$$

In terms of light patterns, or the control of an array of on-off LED emissions, the light pattern would be an array of bright spots represented by each 1 in the matrix $V_1V_2^{tr}$.

A characteristic of this array is that each row and each column is proportional to a common factor. If this factor is zero, then the whole row or column vanishes. This makes beam steering or VLSI interconnection less flexible. However, the principle of superposition can be applied to remedy this problem.

For example, let $$V_1=[100],$$

$$V_2=[010], \quad (10)$$

and let $T=V_1V_2^{tr}+V_2V_2^{tr}+V_1V_2^{tr}=$ $$\begin{vmatrix} 1&0&0 \\ 0&0&0 \\ 0&0&0 \end{vmatrix} + \begin{vmatrix} 0&0&0 \\ 0&1&0 \\ 0&0&0 \end{vmatrix} + \begin{vmatrix} 0&1&0 \\ 0&0&0 \\ 0&0&0 \end{vmatrix} = \begin{vmatrix} 1&1&0 \\ 0&1&0 \\ 0&0&0 \end{vmatrix} \quad (11)$$

then a variety of patterns can be obtained. Finally, in the beam control of a phased array antenna, multilevel values instead of binary values of vector components need be used.

In summary, the present invention provides apparatus for real-time optical generating of second-rank tensors through vector outer-product in a crystal of nonlinear photorefractive material. The method is highly flexible and can be performed in real-time with speed suitable for systems requiring fast computations.

I claim:

1. A real-time optical second-rank tensor generator comprising a nonlinear refractive crystal having two parallel sides, means for generating a first coherent vector beam representing a linear array of vector components, means for expanding said first vector beam in a direction perpendicular to said linear array of said first vector components, means for collimating said first expanded vector beam onto one of said two parallel sides of said crystal, means for generating a second coherent vector beam representing a linear array of vector components oriented perpendicular to said linear array of said first vector components, means for expanding said second vector beam in a direction perpendicular to said linear array of said second vector beam components, means for collimating said second expanded vector beam onto the second of said two parallel sides of said crystal in exact opposition to said first expanded vector, means for producing a coherent plane wave pumping beam for all of said first and second vector beams expanded, and a beamsplitter positioned in the path of said plane wave pumping beam to reflect said plane wave pumping beam onto said one side of said crystal, thereby to produce four-wave mixing in order to generate a conjugated beam from said nonlinear photorefractive crystal that represents said second-rank tensor.

2. A real-time optical second-rank tensor generator as defined in claim 1 wherein said first and second vector beams and said plane wave pumping beam are generated at the same frequency.

3. A real-time optical second-rank generator as defined in claim 2 wherein said first and second vector beams are spatially modulated in amplitude to set values of vector components.

4. A method for real-time optical generation of a second-rank tensor by multiplication of two vectors using a nonlinear refractive crystal having two parallel sides, comprising the steps of generating separately a first and a second orthogonally disposed spatially modulated vector beam of coherent light representing linear arrays of components of respective ones of said two vectors, expanding one of said two vectors in a direction perpendicular to its linear array of vector components, and expanding the other of said two vectors in a direction perpendicular to its linear array of vector components, collimating said two vector beams after expansion onto said parallel sides of said nonlinear refractive crystal with one vector beam on one side and the other vector beam on the other side of said two parallel sides, and with the two vector beams in exact opposition, generating a coherent plane wave pumping beam for all of said two vector beams expanded and reflecting said pumping beam onto one of said two parallel sides of said nonlinear refractive crystal using a beamsplitter, said pumping beam being reflected onto said one of said two parallel sides of said crystal at an angle with said two vector beams, thereby to provide four-wave mixing of said pumping beam with said two vector beams to produce a conjugate beam that represents said second-rank tensor propagating in exact opposition with said pumping beam.

5. A method as defined in claim 4 wherein said two vector beams are generated at the same frequency as said pumping beam.

6. A method as defined in claim 5 wherein said two vector beams are spatially modulated in amplitude to set values of vector components.

* * * * *